United States Patent [19]

Shimazaki

[11] Patent Number: 5,278,672

[45] Date of Patent: Jan. 11, 1994

[54] IMAGE SIGNAL PROCESSING APPARATUS

[75] Inventor: Osamu Shimazaki, Kanagawa, Japan

[73] Assignee: Fuji Photo Film Co., Ltd., Kanagawa, Japan

[21] Appl. No.: 866,306

[22] Filed: Apr. 13, 1992

Related U.S. Application Data

[63] Continuation of Ser. No. 466,539, Jan. 17, 1990.

[30] Foreign Application Priority Data

Jan. 20, 1989 [JP] Japan .................... 1-12135

[51] Int. Cl.$^5$ .............................................. H04N 1/40
[52] U.S. Cl. ................................... 358/456; 358/465; 358/466
[58] Field of Search .............. 358/455, 456, 457, 458, 358/459, 461, 463, 465, 466, 467, 448, 443

[56] References Cited

U.S. PATENT DOCUMENTS

| | | | |
|---|---|---|---|
| 3,916,096 | 10/1975 | Everett | 358/283 |
| 4,340,912 | 7/1982 | Troxel | 358/283 |
| 4,394,662 | 7/1983 | Yoshida | 346/33 R |
| 4,450,485 | 5/1984 | Oshikoshi | 358/283 |
| 4,550,431 | 10/1985 | Werth | 382/1 |
| 4,821,109 | 4/1989 | Roe | 358/456 |
| 5,065,256 | 11/1991 | Suganuma et al. | 358/455 |

OTHER PUBLICATIONS

English translation of Harada et al, "Randon Number Generation by Use of M-Sequence" presented at the 25th Annual Meeting of . . . ), Collected Papers at the Annual Meeting of the Society for Measurement and Automatic Control, vol. 23, No. 8 (Aug. 1987).

Lewis et al "Generalized Feedback Shift Register Pseudorandom Number Algorithm", Journal of the Association of Computing Machinery, vol. 20, No. 3, Jul. 1973, pp. 456–468.

*Primary Examiner*—Edward L. Coles, Sr.
*Assistant Examiner*—J. Grant, II
*Attorney, Agent, or Firm*—Sughrue, Mion, Zinn, Macpeak & Seas

[57] ABSTRACT

An image signal processing apparatus converting an image signal representing a continuous tone image into an image signal indicating a halftone dot image. The continuous tone image signal is compared with a threshold signal. If the difference between the continuous tone image signal and the threshold signal falls within a predetermined range, then the halftone dot image signal is produced based on a probabilistically established signal. The halftone dot image thus produced is smooth without an appreciable tone jump.

15 Claims, 6 Drawing Sheets

FIG.4

RANDOM NUMBER
PROBABILITY CONTROL TABLE

| $i_1$ | $i_2$ | $r_1$ | $r_2$ | Z |
|---|---|---|---|---|
| 0 | 0 | 0 | 0 | 0 |
| 0 | 0 | 0 | 1 | 0 |
| 0 | 0 | 1 | 0 | 0 |
| 0 | 0 | 1 | 1 | 0 |
| 0 | 1 | 0 | 0 | 0 |
| 0 | 1 | 0 | 1 | 0 |
| 0 | 1 | 1 | 0 | 0 |
| 0 | 1 | 1 | 1 | 1 |
| 1 | 0 | 0 | 0 | 0 |
| 1 | 0 | 0 | 1 | 0 |
| 1 | 0 | 1 | 0 | 1 |
| 1 | 0 | 1 | 1 | 1 |
| 1 | 1 | 0 | 0 | 0 |
| 1 | 1 | 0 | 1 | 1 |
| 1 | 1 | 1 | 0 | 1 |
| 1 | 1 | 1 | 1 | 1 |

Rows grouped as: 0% (first 4 rows), 25% (next 4 rows), 50% (next 4 rows), 75% (last 4 rows). Table labeled 34.

FIG.5

AUXILIARY BIT
DATA TABLE

| P | $i_1$ | $i_2$ |
|---|---|---|
| 0 | 0 | 0 |
| 1 | 0 | 0 |
| 2 | 0 | 0 |
| 3 | 1 | 0 |
| 4 | 0 | 0 |
| 5 | 0 | 0 |
| 6 | 1 | 1 |
| ⋮ | ⋮ | ⋮ |

40

FIG.6(a) IMAGE SIGNAL P

FIG.6(b) THRESHOLD SIGNAL Q

FIG.6(c) HALFTONE DOT IMAGE SIGNAL R

IMAGE SIGNAL PROCESSING APPARATUS

This is a continuation of application Ser. No. 07/466,539 filed Jan. 17, 1990.

BACKGROUND OF THE INVENTION

The present invention relates to an image signal processing apparatus for converting a continuous tone image into a halftone dot image, and more particularly to an image signal processing apparatus for comparing an image signal obtained from a continuous tone image with a threshold signal, and generating an image signal indicative of a half-tone dot image based on a probabilistically established signal if the difference between the image signal and the threshold signal falls within a predetermined range.

Image scanning reading and reproducing systems are widely used in the printing and platemaking industries for electrically processing image information of originals or subjects to produce original film plates with a view to simplifying the entire process and improving the quality of printed images.

The image scanning reading and recording systems are basically constructed of an image input apparatus, an image processing apparatus, and an image output apparatus. In the image input apparatus, image information of an original or subject which is fed to a given image reading position is scanned with a laser beam or the like, and the scanned image information is converted into an electric signal depending on the intensity of the reflected beam of the applied laser beam. Then, the photoelectrically converted image information is processed for gradation correction, profile emphasis, etc., according to platemaking conditions in the image processing apparatus. Thereafter, the processed image signal is converted back into a light signal such as a laser beam signal which is applied to and recorded on an image recording medium of a photosensitive material in the image output apparatus. The image recording medium with the image recorded thereon is developed by an image developing device and will be used as a film plate for printing.

If the image on an original is a continuous tone image such as a photographic image, a painting, or the like, then it is necessary to break up the image into closely spaced dots in order to express the shades of the image. More specifically, a continuous tone image is converted into a halftone dot image which comprises dots whose size depends on the density of the image. According to one method of breaking up a continuous tone image into halftone dots, a light image representing the continuous tone image is radiated onto a recording medium through a contact screen which has a vignetted dot pattern. In the image scanning and reproducing system, a dot screen signal corresponding to a contact screen is electrically produced, and a halftone dot image is generated on the basis of the dot screen signal.

The dot screen signal is composed of a threshold signal which has a number of gradations of tone corresponding to the resolution of the image scanning reading and recording system. A binarized halftone dot image signal is produced when the threshold signal and the image signal representing the continuous tone signal are compared with each other. If the number of gradations of tone of the threshold signal is small, the halftone dot image tends to suffer from a tone jump.

More specifically, FIG. 1 of the accompanying drawings shows the relationship between a threshold signal and the output density of an image which has been broken up into dots based on the threshold signal. Ideally, it is desirable for the output density of the image to have a linear range of gradations as indicated by the dot-and-dash line. Actually, however, the output density of the image which is broken up into dots based on the threshold signal by the image scanning reading and recording system is of discrete values as indicated at $a_1$ through $a_6$ depending on the diameter of a laser beam in the system. When the threshold signal ranges from 2 to 3 or 5 to 6, the output density of the dot-converted image is subjected to a large tone jump.

Such a tone jump may be suppressed if the number of gradations of the threshold signal is increased for a higher resolution. However, this solution is disadvantageous in that the required circuit arrangement is complex, the apparatus is expensive, and a long signal processing time is needed. Another proposal is to compare an image signal with a threshold signal to which randomly produced noise has been added, instead of increasing the gradations of the threshold signal, for producing a halftone dot image. Such a proposal is advantageous in that any tone jumps which are caused are relatively difficult to recognize but still fails to fully eliminate changes in the output density due to a low resolution.

SUMMARY OF THE INVENTION

It is a major object of the present invention to provide an image signal processing apparatus which compares an image signal produced from a continuous tone image with a threshold signal, and generates an image signal representing a halftone dot image based on a probabilistically established signal if the difference between the compared signals falls within a predetermined range, so that a smooth half-tone dot image can quickly and inexpensively be produced from a continuous tone image without an increased resolution.

Another object of the present invention is to provide an image signal processing apparatus comprising comparing means for comparing an image signal representing a continuous tone image with a threshold signal, producing a first signal when the image signal is greater than the threshold signal, or a second signal when the image signal is smaller than the threshold signal, or a third signal when the difference between the image signal and the threshold signal falls within a predetermined range, random number generating means for generating a random number signal, probability signal output means for producing a probability signal depending on the image signal, selection signal output means for producing a selection signal with a probability based on the random number signal and the probability signal, and signal selecting means for producing a halftone dot image signal based on the first or second signal when the first or second signal is produced by the comparing means, or a halftone dot image signal based on the selection signal from the selection signal output means when the third signal is produced by the comparing means.

Still another object of the present invention is to provide the image signal processing apparatus wherein the random number generating means comprises a random number generator based on the M-sequence code theory.

Yet another object of the present invention is to provide the image signal processing apparatus wherein the probability signal output means comprises a data table containing probability code data with respect to the image signal.

A further object of the present invention is to provide the image signal processing apparatus wherein the selection signal output means comprises a data table for producing the selection signal based on a combination of the random number signal and the probability signal.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 4 is a diagram showing a random number probability control table in the apparatus shown in FIG. 3;

FIG. 5 is a diagram showing an auxiliary bit data table in the apparatus shown in FIG. 3; and FIGS. 6(a) through 6(c) are diagrams illustrative of an image signal, a threshold signal, and a halftone dot image signal in the image signal processing apparatus of the invention.

DETAILED DESCRIPTION OF THE PREFERRED EMBODIMENT

Figure 2:
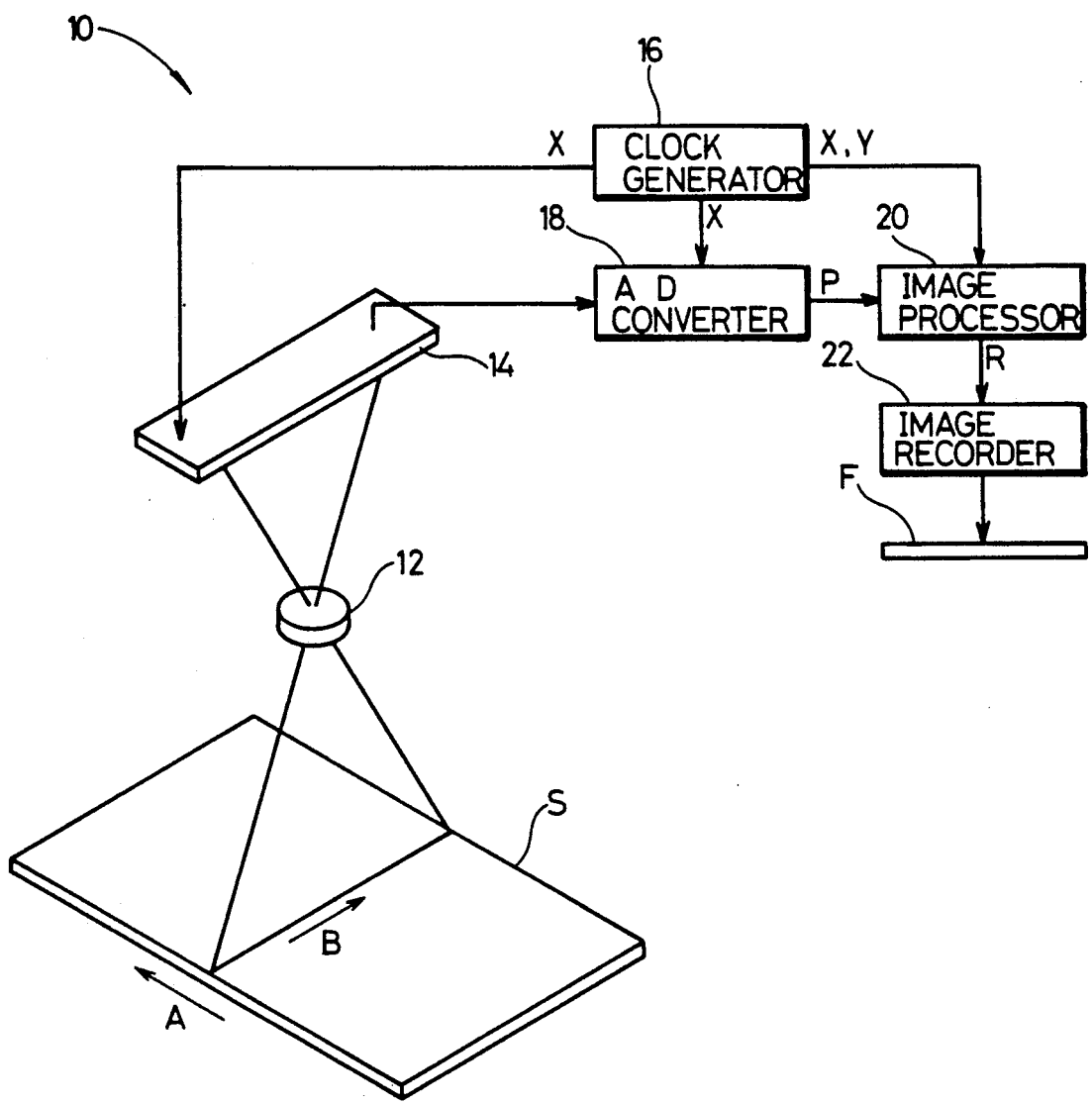
FIG. 2 is a block diagram, partly in perspective, of an image scanning reading and recording system in which the image signal processing apparatus of the invention is incorporated.

FIG. 2 shows an image scanning reading and recording system 10 in which an image signal processing apparatus according to the present invention is incorporated. In the image scanning reading and recording system 10, a continuous tone image borne by an original o subject S is converted into an electric signal, and a halftone dot image is recorded on a film F.

The original S is fed in an auxiliary scanning direction indicated by the arrow A by a feed means (not shown). The continuous tone image carried by the original S is scanned in a main scanning direction indicated by the arrow B, by a CCD (charge-coupled device) 14 serving as a photoelectric transducer means through a focusing optical system 12. The continuous tone image which has been photoelectrically converted by the CCD 14 is converted into a digital image signal P by an A/D converter 18 based on a main scanning clock signal X produced by a clock generator 16. The digital image signal P is then supplied to an image processor 20 which serves as the image signal processing apparatus of the present invention. In the image processor 20, the image signal P is processed into a binarized half-tone dot image signal R which is then applied to an image recorder 22. The image recorder 22 converts the halftone dot image signal R into a light signal borne by a laser beam or the like, and applies the light signal to the film F thus recording a halftone dot image thereon.

Figure 3:
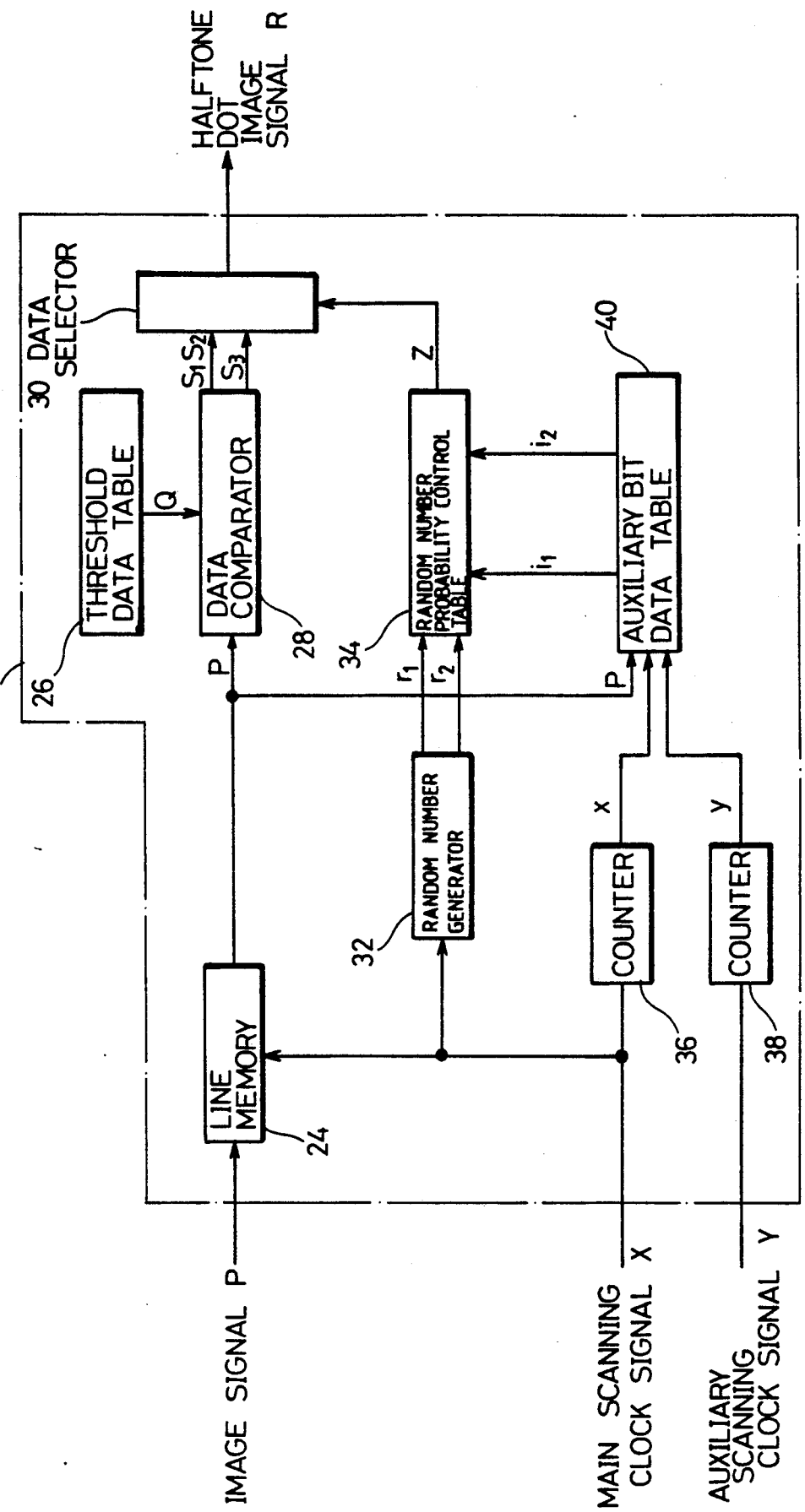
FIG. 3 is a block diagram of the image signal processing apparatus of the present invention.

FIG. 3 shows a halftone dot image signal generator in the image processor 20 shown in FIG. 2. The image processor 20 includes a line memory 24, a threshold data table 26, a data comparator 28 serving as a comparing means, a data selector 30 serving as a signal selecting means, a random number generator 32 serving as a random number generating means, a random number probability control table 34 serving as a selection signal output means, counters 36, 38, and an auxiliary bit data table 40 serving as a probability signal output means.

The line memory 24 stores the image signal P of the continuous tone image per main scanning line. The threshold data table 26 holds a threshold signal Q for converting a continuous tone image into a halftone dot image. The data comparator 28 compares the image signal P and the threshold signal Q with respect to their magnitude. The data comparator 28 sends a signal $S_1$ to the data selector 30 when the image signal P is larger in magnitude than the threshold signal Q, a signal $S_2$ to the data selector 30 when the image signal P is smaller in magnitude than the threshold signal Q, or a signal $S_3$ to the data selector 30 when the image signal P is equal in magnitude to the threshold signal Q. The data selector 30 produces a binarized halftone dot image signal R based on the signal $S_1$, $S_2$, or $S_3$ from the data comparator 28 and a selection signal Z from the random number probability control table 34.

The random number probability control table 34 produces the selection signal Z based on a 2-bit random number signal ($r_1$, $r_2$) from the random number generator 32 and a 2-bit auxiliary bit signal ($i_1$, $i_2$) representing probability code data from the auxiliary bit data table 40. FIG. 4 shows the random number probability control table 34 by way of example. The random number generator 32 may comprise a circuit for generating random numbers based on the M-sequences coding theory described in "Random Number Generation by Use of M-Sequence" published in Japan in Collected Papers, Vol. 23, No. 8, pages 26 through 31 (Aug., 1987), Measurement and Automatic Control Society, or may generate random numbers based on a software program, or from a predetermined random number table.

The auxiliary bit data table 40 holds a probability signal for establishing a probability at the time the selection signal Z is in a certain condition, e.g., it is "1". The auxiliary bit data table 40 is determined in advance as shown in FIG. 5 as the auxiliary bit signal ($i_1$, $i_2$) i.e. predetermined probability signal ($i_1$, $i_2$) with respect to the image signal P based on a tone jump of the output density shown in FIG. 1. The counters 36, 38 generate timing signals x, y which extract the auxiliary bit signal ($i_1$, $i_2$) from the auxiliary bit data table 40, according to main and auxiliary scanning clock signals X, Y.

Operation and advantages of the image scanning reading and recording system incorporating the image signal processing apparatus of the present invention will be described below.

The CCD 14 scans the continuous tone image on the original S in the main scanning direction indicated by the arrow B through the focusing optical system 12, while the original S is being fed in the auxiliary scanning direction indicated by the arrow A. The CCD 14 converts the continuous tone image into an electric signal. The electric signal from the CCD 14 is then converted into a digital image signal P by the A/D converter 18 based on the main scanning clock signal X from the clock generator 16. The image signal P per main scanning line is stored in the line memory 24 in the image processor 20, and thereafter is compared with the threshold signal Q stored in the threshold data table 26 by the data comparator 28 (see FIG. 3).

The data comparator 28 compares the image signal P with the threshold signal Q as to their magnitude. The data comparator 28 applies the signal $S_1$ to the data selector 30 when P>Q, the signal $S_2$ to the data selector 30 when P<Q, and the signal $S_3$ to the data selector 30 when P=Q. If the signal $S_1$ is applied from the data Comparator 28, then the data selector 30 applies a halftone dot image signal R which is an ON signal (=1) to the image recorder 32. If the signal $S_2$ is applied from the data comparator 28, then the data selector 30 applies a halftone dot image signal R which is an OFF signal (=0) to the image recorder 32. If the signal $S_3$ is applied from the data comparator 28, then the data selector 30 applies an ON signal (=1) or an OFF signal (=0) based on the selection signal Z from the random number probability control table 34, as a halftone dot image signal R to the image recorder 22. In response to the ON or OFF signal thus applied, the image recorder 22 controls a light signal such as a laser beam signal to record a halftone dot image on the film F.

Figure 1:
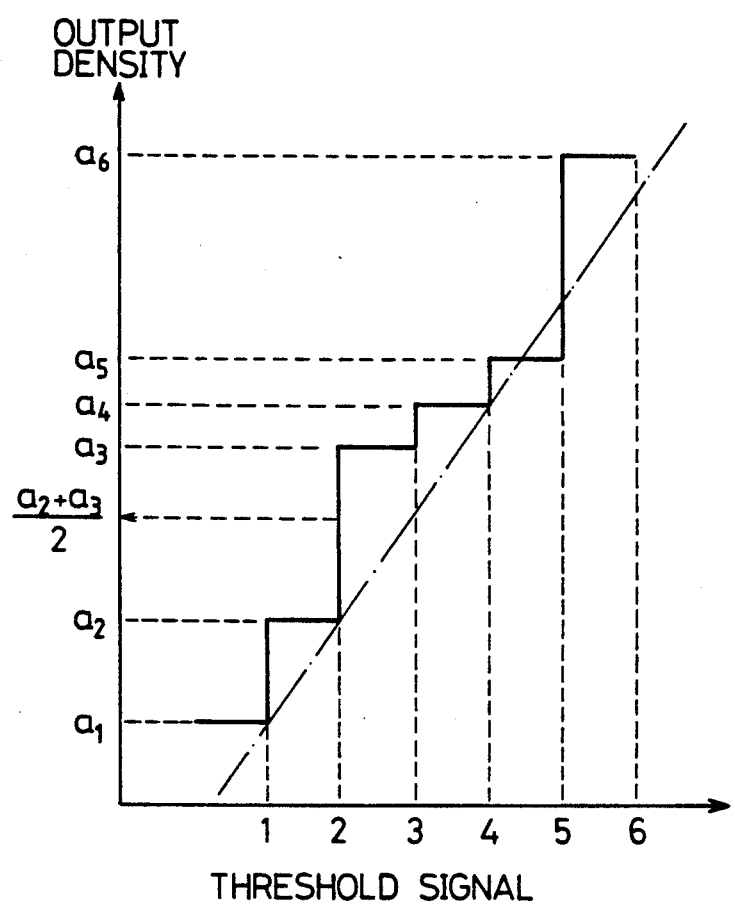
FIG. 1 is a diagram showing the relationship between a threshold signal and an output density in a conventional arrangement, the diagram also illustrating the generation of a new output density in an image signal processing apparatus according to the present invention.

The random number probability control table 34 which issues the selection signal Z is arranged as shown in FIG. 4. More specifically, the random number probability control table 40 determines the selection signal Z based on the 2-bit random number signal $(r_1, r_2)$ which is supplied from the random number generator 32 and the 2-bit auxiliary bit signal $(i_1, i_2)$ which is supplied from the auxiliary bit data table 40. The probability that the selection signal Z is "1" is selected to be 0%, 25%, 50%, and 75% with respect to the four combinations, respectively, of the auxiliary bit signals $(i_1, i_2)$. The auxiliary bit data table 40 is arranged as shown in FIG. 5, for example, based on the relationship between the threshold signal and the output density as shown in FIG. 1. For example, when the image signal P is "3", the probability that the halftone dot image signal R is an ON signal (=1) is selected to be 50% with respect to the threshold signal Q which is "3", so that the output density is of an intermediate level between $a_2$ and $a_3$ in FIG. 1. Therefore, the auxiliary bit signal is selected such that $i_1=1$ and $i_2=0$ with respect to the image signal P which is "3". When the image signal P is "6", the auxiliary bit signal is selected such that $i_1=i_2=1$ so that the halftone dot image signal R is an ON signal (=1) with the probability of 75%.

The selection signal Z is determined using the random number probability control table 34 as shown in FIG. 4 and the auxiliary bit data table 40 as shown in FIG. 5. For example, when the image signal P is "3", the auxiliary bit signal $(i_1=1, i_2=0)$ is supplied from the auxiliary bit data table 40 to the random number probability control table 34 based on the timing signals x, y from the counters 36, 38. In response to the auxiliary bit signal from the auxiliary bit data table 40, the random number probability control table 34 applies a selection signal Z which will be "1" with the probability of 75% to the data selector 30. When the data selector 30 is supplied with the signal $S_1$ or $S_2$ from the data comparator 28, the data selector 30 applies a halftone dot image signal R based on the signal $S_1$ or $S_2$ to the image recorder 22. When the data selector 30 is supplied with the signal S, from the data comparator 28, the data selector 30 applies a halftone dot image signal R based on the selection signal Z from the random number probability control table 34, to the image recorder 22.

FIG. 6(c) shows a halftone dot image signal which is produced when the image signal P which is "3" (FIG. 6(a)) and the threshold signal Q which ranges from "0" to "8" FIG. 6(b)). The halftone dot image signal R which is an ON signal (=1) corresponding to the threshold signal Q which is "3" is generated with the probability of 50%. Therefore, the output density of a halftone dot image that is recorded on the film F by the image recorder is of an intermediate level $(a_2+a_3)/2$ between $a_2$ and $a_3$ in FIG. 1. With this intermediate density level added, the recorded halftone dot image is smooth without a recognizable tone jump.

In the above embodiment, the 2-bit random number signal $(r_1, r_2)$ and the 2-bit auxiliary bit signal $(i_1, i_2)$ are used in order to obtain the selection signal Z. However, if these signals are represented by more bits, then the probability that the selection signal Z is "1" can be selected in a greater number of ranges for thereby recording a smoother continuous tone image on the film F.

With the present invention, as described above, an image signal representing a continuous tone image is compared with a threshold signal, and an image signal representing a halftone dot image corresponding to the continuous tone image is generated on the basis of a selection signal that is produced with a predetermined probability when the difference between the compared signals falls within a predetermined range. Since fluctuations or variations in the halftone dot image can be suppressed by the probability with which the selection signal is generated, the generated continuous tone image is rendered smooth without increasing the number of gradations at the time of converting the continuous tone image signal into the halftone dot image signal. Inasmuch as it is not necessary to increase the resolution in order to obtain a smooth image, it is possible to process an image signal inexpensively at a high speed.

Although a certain preferred embodiment has been shown and described, it should be understood that many changes and modifications may be made therein without departing from the scope of the appended claims.

What is claimed is:

1. An image signal processing apparatus comprising:
    comparing means for comparing an image signal representing a continuous tone image with a threshold signal, producing a first signal when the image signal is greater than the threshold signal, a second signal when the image signal is smaller than the threshold signal, and a third signal when the difference between the image signal and the threshold signal falls within a predetermined range;
    random number generating means for generating a random number signal;
    probability signal output means for producing a predetermined probability signal based on a magnitude of the image signal;
    selection signal output means, connected to said random number generating and probability signal output means, for producing a selection signal with a predetermined probability based on both said random number signal and said predetermined probability signal; and
    signal selecting means, connected to outputs of said comparing and selection signal output means, for producing a halftone dot image signal based on said first or second signal when the first or second signal is produced by said comparing means, and a halftone dot image signal based on said selection signal from said selection signal output means when said third signal is produced by said comparing means;

wherein said probability signal output means comprises an auxiliary bit data table containing probability code data with respect to the image signal, said probability signal output means outputting an N (N≧1) bit probability signal, based on said magnitude of the image signal, that identifies a value of the image signal magnitude that corresponds to an output density of the dot converted image that would be subjected to an undesirably large tone jump, wherein said signal selecting means prevents said undesirably large tone jump.

2. An image signal processing apparatus according to claim 1, wherein said selection signal output means comprises a random number probability control table, connected to said random number generating and probability signal output means, for producing a selection signal based on a combination of said random number signal and said predetermined probability signal.

3. An image signal processing apparatus comprising:

comparing means for comparing an image signal representing a continuous tone image with a threshold signal, producing a first signal when the image signal is greater than the threshold signal, a second signal when the image signal is smaller than the threshold signal, and a third signal when the difference between the image signal the threshold signal falls within a predetermined range;

random number generating means for generating a random number signal;

probability signal output means for producing a predetermined probability signal based on a magnitude of the image signal;

selection signal output means, connected to said random number generating and probability signal output means, for producing a selection signal with a predetermined probability based on both said random number signal and said predetermined probability signal; and signal selecting means, connected to outputs of said comparing and selection signal output means, for producing a halftone dot image signal based on said first or second signal when the first or second signal is produced by said comparing means, and a halftone dot image signal based on said selection signal from said selection signal output means when said third signal is produced by said comparing means;

wherein the predetermined probability signal indicates a likelihood that an undesirably large tone jump will occur during conversion of the continuous tone image into the halftone dot image signal.

4. An image signal processing apparatus comprising:

comparing means for comparing an image signal representing a continuous tone image with a threshold signal, producing a first signal when the image signal is greater than the threshold signal, a second signal when the image signal is smaller than the threshold signal, and a third signal when the difference between the image signal and the threshold signal falls within a predetermined range;

random number generating means for generating a random number signal;

probability signal output means for producing a predetermined probability signal based on a magnitude of the image signal;

selection signal output means, connected to said random number generating and probability signal output means, for producing a selection signal with a predetermined probability based on both said random number signal and said predetermined probability signal; and signal selecting means, connected to outputs of said comparing and selection signal output means, for producing a halftone dot image signal based on said first or second signal when the first or second signal is produced by said comparing means, and a halftone dot image signal based on said selection signal from said selection signal output means when said third signal is produced by said comparing means;

wherein said probability signal output means comprises an auxiliary bit data table for producing the predetermined probability signal based on a magnitude o the image signal.

5. An image signal processing apparatus comprising:

comparing means for comparing an image signal representing a continuous tone image with a threshold signal, said comparing means outputting at least one of first, second and third signals based on said comparison, said comparing means outputting said third signal when a difference between the image signal and the threshold signal falls within a predetermined range;

random number generating means for generating a random number signal;

probability signal output means for producing a predetermined probability signal depending on the image signal;

a random number probability control table, connected to said random number generating and probability signal output means, for producing a selection signal with a predetermined probability based on a combination of said random number signal and said predetermined probability signal; and signal selecting means, connected to the random number probability control table and comparing means, for producing a halftone dot image signal based on said first or second signal when the first or second signal is produced by said comparing means, and for producing a halftone dot image based on said selection signal from said random number probability control table when said third signal is produced by said comparing means and supplied to the signal selecting means;

wherein said probability signal output means comprises an auxiliary bit data table containing probability code data with respect to the image signal, said probability signal output means outputting an N (N≧1) bit probability signal, based on said magnitude of the image signal, that identifies a value of the image signal magnitude that corresponds to an output density of the dot converted image that would be subjected to an undesirably large tone jump, wherein said signal selecting means prevents said undesirably large tone jump.

6. An image processing apparatus for converting a continuous tone image signal into a halftone dot image signal, said apparatus comprising:

random number generation means for generating a random number;

probability determining means for producing a probability signal indicating a likelihood that an undesirably large tone jump will occur during conversion of the continuous tone image signal into the halftone dot image signal based on the continuous tone image signal;

determination means for determining whether a magnitude of the continuous tone image signal is within a predetermined range of a magnitude of a threshold signal; and selection means, connected to an output of said probability determining and determination means, for producing the halftone dot image signal in accordance with both the random number and the probability signal when said determination means determines that the continuous tone image signal is within the predetermined range of the threshold signal.

7. An image processing apparatus according to claim 6, wherein said selection means comprises:

a data table for producing a selection signal based on a combination of the random number and the probability signal; and a selector for producing the halftone dot image signal based on the selection signal when said determination means determines that the continuous tone image signal is within the predetermined range of the threshold signal.

8. An image processing apparatus according to claim 6, wherein said selection means produces the halftone dot image signal based on a combination of the random number and the probability signal.

9. An image signal processing apparatus according to claim 6, further comprising:

a random number probability control table, connected to said random number generating and probability determining means, for producing a selection signal with a predetermined probability based on a combination of said random number signal and said predetermined probability signal.

10. An image signal processing apparatus according to claim 6, wherein said probability signal output means comprises:

an auxiliary bit data table containing probability code data with respect to the image signal, said probability signal output means outputting an N (N≧1) bit probability signal, based on said magnitude of the image signal, that identifies a value of the image signal magnitude that corresponds to an output density of the dot converted image that would be subjected to an undesirably large tone jump, wherein said signal selecting means prevents said undesirably large tone jump.

11. An image signal processing apparatus for converting a continuous tone image signal into a half tone dot image signal, said apparatus comprising:

a data comparator for comparing the image signal with a single threshold signal, said data comparator outputting a first signal when said image signal is greater than said single threshold signal, a second signal when the image signal is smaller than the single threshold signal, and a third signal when the difference between the image signal and the single threshold signal falls within a predetermined range;

a random number generator for generating a random number;

an auxiliary bit data table for producing a predetermined probability signal based on a relationship between the single threshold signal and an output density of the image signal;

a random number probability control table, connected to said random number generator and said auxiliary bit data table, for producing a selection signal based on said predetermined probability signal and the random number; and a data selector, connected to said data comparator and said random number probability control table, for producing a half tone dot image based on said selection signal from said random number probability control table when said third signal is produced by said data comparator.

12. An image signal processing apparatus according to claim 11, wherein said probability signal output means comprises an auxiliary bit data table containing probability code data with respect to the image signal, said probability signal output means outputting an N (N≧1) bit probability signal, based on said magnitude of the image signal, that identifies a value of the image signal magnitude that corresponds to an output density of the dot converted image that would be subjected to an undesirably large tone jump, wherein said signal selecting means prevents said undesirably large tone jump.

13. An image signal processing apparatus, according to claim 11, wherein said data comparator outputs said third signal exclusively when the image signal equals the single threshold signal.

14. An image signal processing apparatus, according to claim 11, wherein said random number constitutes an N (N≧1) bit random number signal and said predetermined probability signal constitutes an N (N≧1) bit auxiliary signal.

15. An image processing apparatus, according to claim 14, wherein said random number probability control table stores a selection signal for each possible combination of said N (N≧1) bit random number signals and said N (N≧1) bit auxiliary bit signal, said random number probability control table separating said selection signals into four groups, representing different probabilities that said selection signal will equal unity, said N (N≧1) bit auxiliary bit signal selecting a desired one of said four groups, thereby selecting the probability that said selection signal will equal unity.

* * * * *